Dec. 28, 1926.

F. M. REID 1,611,947

SEMI-TRAILER AND SUPPORT

Filed July 9, 1926  3 Sheets-Sheet 1

INVENTOR.
Frederick Malcolm Reid
BY
Stuart E Barnes
ATTORNEY.

Dec. 28, 1926.
F. M. REID
1,611,947
SEMI-TRAILER AND SUPPORT
Filed July 9, 1926    3 Sheets-Sheet 2
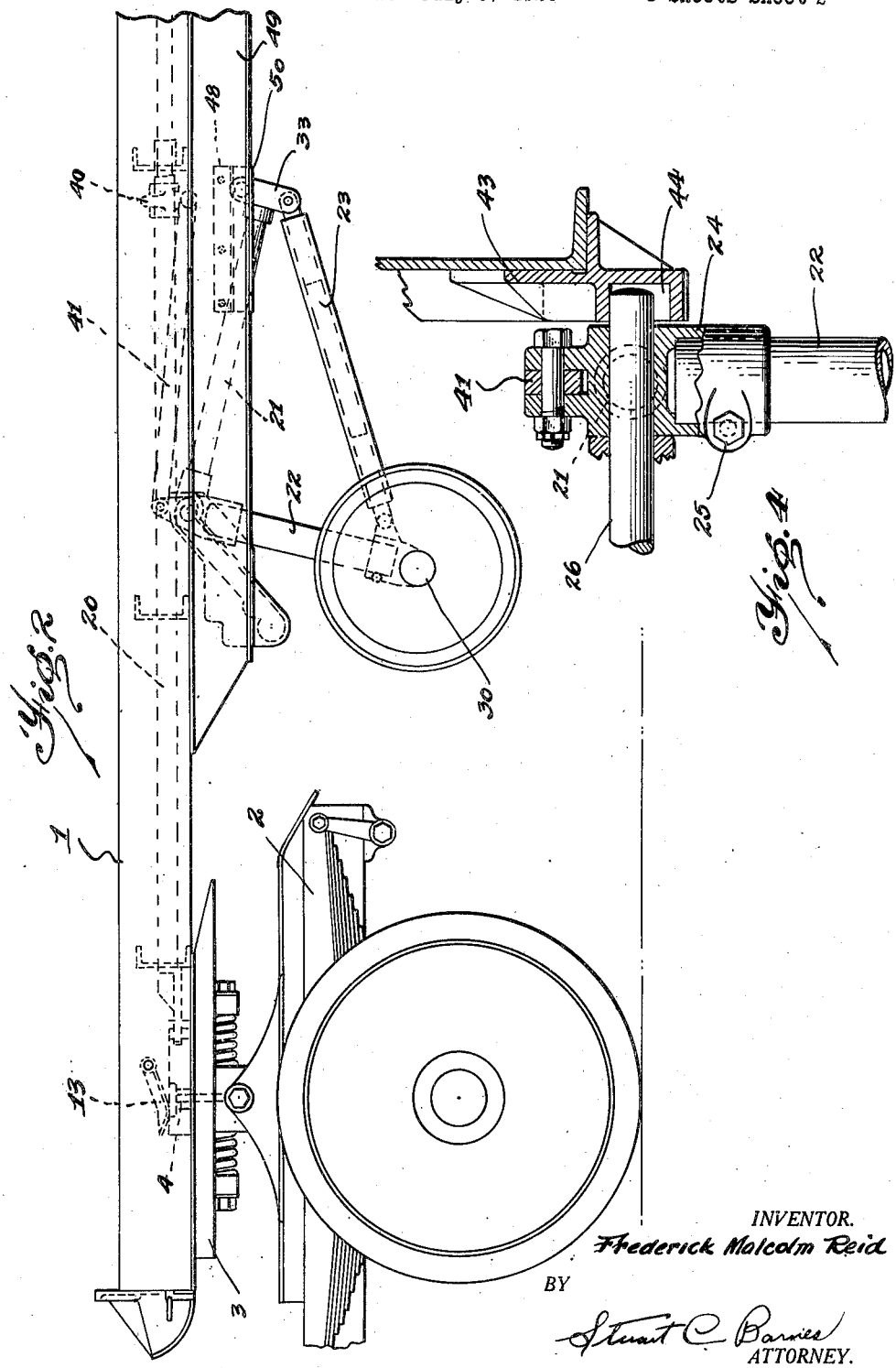
INVENTOR.
Frederick Malcolm Reid
BY
Stuart C. Barnes
ATTORNEY.

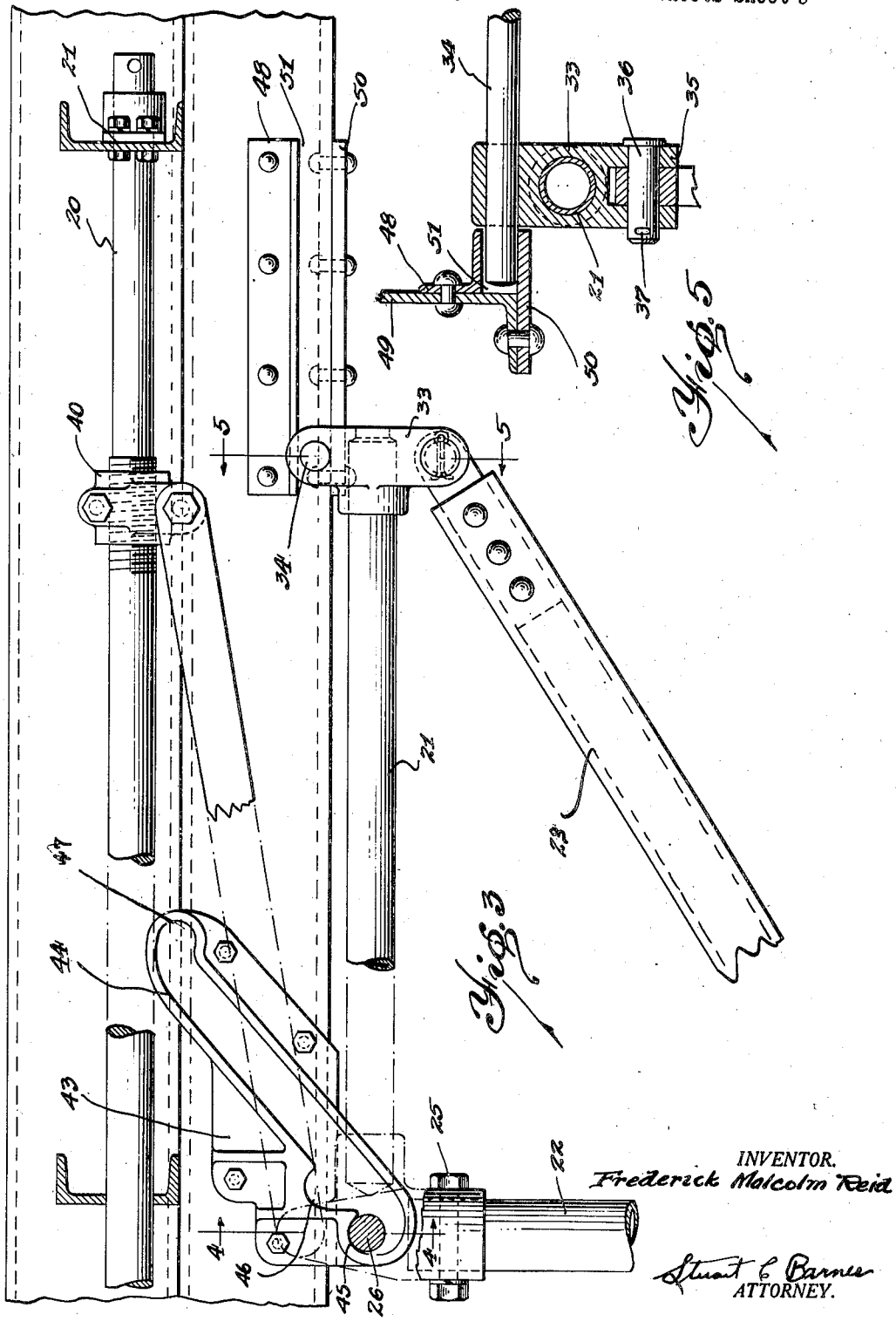

Patented Dec. 28, 1926.

1,611,947

UNITED STATES PATENT OFFICE.

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN.

SEMITRAILER AND SUPPORT.

Application filed July 9, 1926. Serial No. 121,289.

This invention relates to trailers and has to do more particularly with one of the semi-trailer type, which is supported in part by wheels of its own, and in part by the vehicle which draws the semi-trailer.

Semi-trailers usually are provided with a frame or platform with wheels at the rear end for supporting the same. The forward end is usually provided with an upper fifth wheel construction which rests upon a lower fifth wheel construction of a tractor or truck. The tractor is detachable from the semi-trailer and there is usually a support for holding up the forward end of the trailer when the tractor is disconnected therefrom.

According to the present invention the body of the semi-trailer has mounted thereon, a support which is in the form of a frame-like structure. This frame is secured to the trailer in such a way that it can be lifted from the ground when the trailer is secured to the tractor. The lifting of the support is accomplished automatically as the trailer becomes locked with the tractor, there being operable connections between the support and the locking means. The support is secured to the trailer in such a way that the entire weight of the support is not lifted, but only so much of the support is raised as is required to remove it from the ground. The operable connections are so disposed that the support is pulled upwardly.

This arrangement is advantageous in that the fact that only a part of the support is raised, in conjunction with the fact that it is pulled upwardly, as distinguished from the pushing action, makes for ease of operation, thus preventing undue jamming and breaking of parts. Heretofore in some semi-trailers the entire supporting structure has been lifted, and this was accomplished by a pushing action. Considerable force was required to accomplish the operation, and as a result some of the parts, particularly the mechanism which locks the trailer with the truck, soon became broken.

The accompanying drawings show a satisfactory form of the invention:

Fig. 2 is a side elevation.

Fig. 3 is an enlarged detail in section taken on line 3—3 of Fig. 1.

Fig. 4 is a sectional detail taken on line 4—4 of Fig. 3.

Fig. 5 is a section taken on line 5—5 of Fig. 3.

Figure 1:
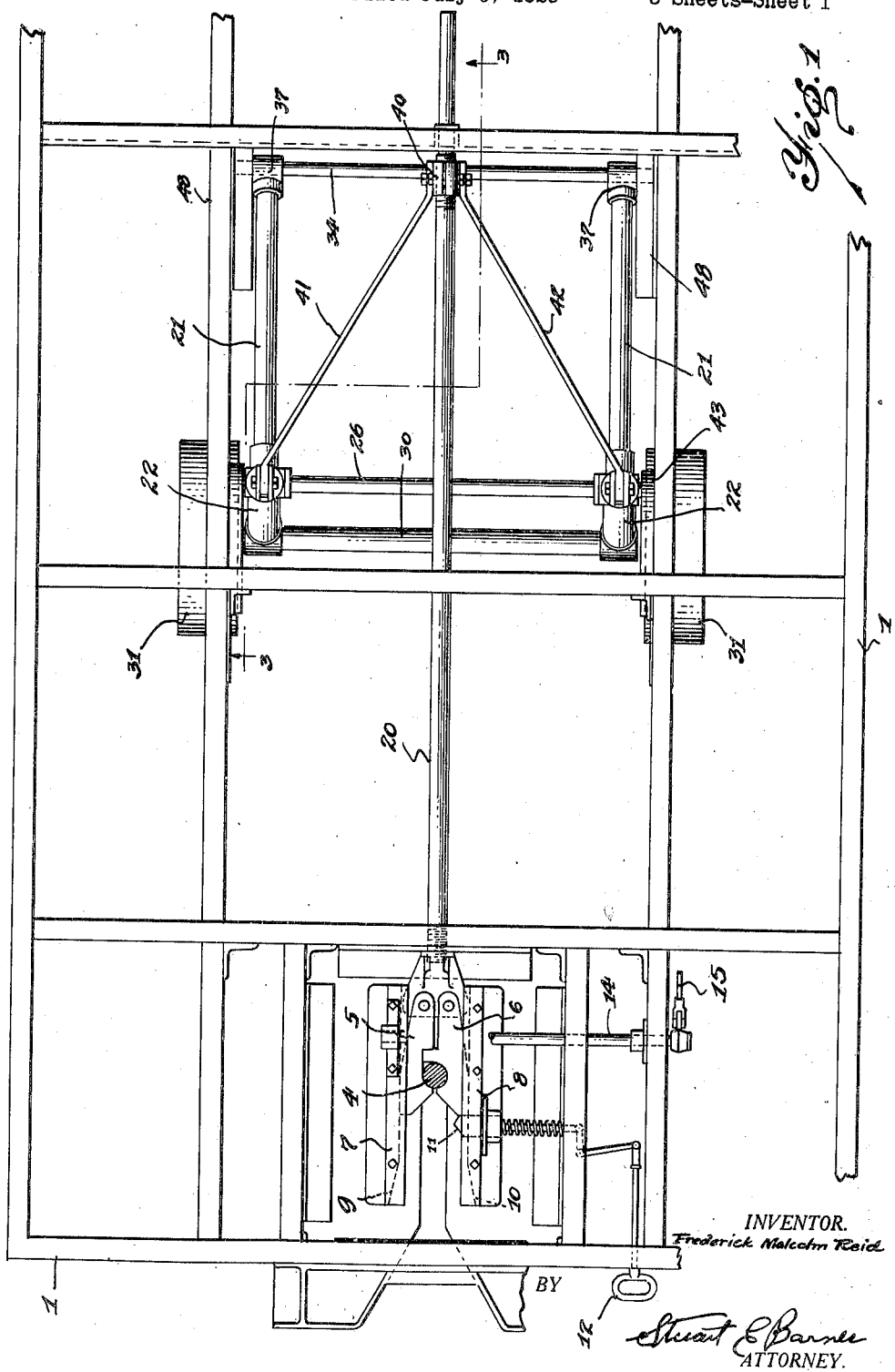
Fig. 1 is a plan view showing the trailer frame, the lock and support.

In the drawings the frame of the semi-trailer is indicated at 1. The forward end of the trailer is carried by a tractor 2 which carries a lower fifth wheel construction 3, having a king pin 4. The semi-trailer (Fig. 1) is provided with a locking mechanism which detachably engages the king pin of the tractor. The details of this locking mechanism will not be gone into as it forms the subject matter of a separate application. The rear end of the semi-trailer is carried by wheels (not shown) which are secured to the semi-trailer frame in a customary or desired manner.

The locking mechanism, in general, is composed of a clam lock, which is operable by a reciprocable movement. This clam lock includes a pair of pivoted members 5 and 6, slidable in undercut guideways formed by members 7 and 8. The forward ends of the guideways are turned outwardly, as at 9 and 10. A latch 11 is provided for holding the reciprocating lock in its locked position, and this latch is operable for release by means of the handle 12 and the several connections shown for connecting it to the latch. The trailer may also include means for applying brakes to the rear wheels. This means includes, in part, a member 13 operable through the king pin. This member is mounted upon a rock shaft 14 which is connected to the brakes on the rear wheels by means of a rod 15.

The lock (Fig. 1) is shown as being engaged with the king pin carried by the tractor, the latch 11 holding the lock in this position. To detach the tractor, an operator manipulates the handle 12 to retract the latch 11, whereupon forward movement of the tractor pulls the clam lock forward, and when the lock reaches the end and enlarged portions of the guideways, the two members 5 and 6 separate to release the king pin. This operation is reversed when a tractor is secured to the semi-trailer. The tractor backs into the semi-trailer, and the king pin forces the clam lock back to the position shown in Fig. 1, whereupon the latch 11 moves into place by reason of the coil spring shown.

Connected to the lock is a rod 20 which extends for a considerable distance toward the rear of the trailer frame. This rod is reciprocable with the lock. The rearmost end of the rod 20 may be supported and a bearing fixture 21 which is secured to one of the cross members of the frame structure of the semi-trailer. The reciprocable movement of the lock and rod is utilized to raise the trailer support when a tractor backs into the trailer, and to lower the trailer support when the tractor moves away from the trailer and becomes detached.

The support consists of a frame which is of a triangular shape, there being one of such frames carried on each side of the trailer. Each frame consists of a horizontal member 21, a vertical member 22, the ends of which are connected by the member 23. The members 21 and 22 are connected together, as shown in Fig. 4, by means of a member 24 which may be a casting. Vertical member 22 may be placed in a socket-like portion of the casting 24. The casting may be provided with holes and the member 22 grooved so as to be held together by means of a bolt 25. Horizontal member 21 is also secured to the member 24, and it may be secured thereto in the same manner in which the member 22 is secured, or in any other desired manner. A rod 26 is secured to the member 24 and extends across the frame, as shown in Fig. 1, where it is secured to the triangular frame on that side of the trailer. Carried at the lower ends of vertical members 22 is an axle 30. Wheels 31 are mounted upon the ends of the axle. At the rear end of each horizontal member 21 is secured a casting-like member 33. Extending across the trailer is a rod 34 which is secured to both of the members 33. This member 33 may be bifurcated, as shown at 35, and the member 23 of the frame may lie within this bifurcated portion and be secured thereto by means of a pin 36 held in place by a cotter key 37. The member 23 may be secured to the lower end of the vertical members 22 in a similar manner.

As indicated in Figs. 1 and 3, a clamp-like member 40 is secured to the rod 20. Pivotally connected with this clamp-like member are members 41 and 42 which have their opposite ends connected to the castings 24, as shown in Fig. 4.

Mounted on each side of the frame is a member 43 (Fig. 3). This member may be a casting, and secured to the frame by means of bolts, as shown. The member includes a slideway 44 disposed at an angle to the vertical, and in these slideways the ends of the cross rod 26 operate. The lower end of the slideway may be provided with recesses 45 and 46 within which the ends of the cross rod 26 rest when the frame is supporting the trailer. The upper ends of the slideways may be turned at an angle, as shown at 47, for receiving the ends of the cross rod when the trailer is being transported by a tractor.

As indicated in Fig. 5 the ends of the cross rod 34 are slidably carried by the frame. For this purpose an angle iron 48 may be riveted or bolted to a channel member 49 of the frame. Another piece 50 may be riveted or bolted to the lower portion of the channel frame member, thus providing a slideway 51 for the ends of the cross rod 34.

By this construction it will be observed that I have provided a support for the semi-trailer which is in the form of a rigid frame structure. This support is movable to and from supporting position by the reciprocable movement of the rod 20 connected to the lock. In Figs. 1 and 2 the semi-trailer is connected to a tractor and the support is in raised position. When the semi-trailer becomes disconnected from the tractor by the forward unlocking motion of the clam lock, heretofore described, the rod 20 also moves forward and acts through the connecting rods 41 and 42 to permit the frame to slide downwardly in the slideway 44. As the tractor pulls out from under the trailer frame, the weight thereof drops upon the cross bar 26, the ends of which are then received in the recesses 45, as shown in Fig. 3. The recesses 46 are provided for safety purposes so as to prevent the trailer frame from dropping to the ground in case the rod 26 fails to become engaged in the recesses 45.

When it is desired to again connect the semi-trailer with the tractor, the tractor backs under the forward end of the trailer frame and takes the weight off the supporting frame. Further backward movement of the tractor pushes the clam lock back together with the rod 20. This pulls the supporting frame back to the position shown in Fig. 2. By reason of the fact that the connection between the rod 20 and the trailer frame is located to the rear of the forward end of the frame, the frame is pulled up the inclined slide 44. This is advantageous as it requires much less effort than in the previous types where a pushing action was utilized. The rear end of the frame is not lifted, but slides back in a longitudinal plane. This reduces further the effort necessary to remove the supporting frame from the ground, because the frame as a whole is not lifted but merely the forward end thereof is lifted.

The supporting structure for the semi-trailer is shown in conjunction with a clam lock. It will be understood, however, that the supporting structure can be used with any other type of lock which is operable by a movement relative to the trailer frame, it being only necessary to utilize this movement for the purpose of lifting the supporting frame. Also, it will be understood that this supporting frame need not be used in conjunction with a lock, as means, separate from the lock, may be provided for operating the frame as the tractor becomes attached or detached from the trailer.

This invention affords a positive movement of the trailer supporting structure in both directions. When the tractor moves away from the trailer there is a positive movement of the supporting frame to supporting position whereby accidental dropping of the trailer frame to the ground is positively prevented. Likewise, there is a positive lifting action when the tractor becomes attached to the trailer thus insuring that the supporting frame is always moved to inoperative position when the tractor and trailer become locked together.

I claim:

1. In a semi-trailer, a rigid frame for supporting the semi-trailer, means connecting the frame to the semi-trailer which permits one end thereof to be moved upwardly and the other end to be moved longitudinally, and means for causing such movement of the frame when a tractor engages the trailer.

2. In a semi-trailer, a rigid frame for supporting the semi-trailer, a device including an inclined surface connecting one end of the frame to the trailer, and a device including a horizontal surface for connecting another end of the frame to the trailer, means connected to the frame for moving the said ends along their respective surfaces when the semi-trailer is engaged by a tractor.

3. In a semi-trailer, a frame for supporting the semi-trailer, this frame being movable up an inclined surface, and draft means connected to the frame in such a way as to pull on the frame in the general direction of the said inclined surface whereby the frame is pulled up such surface when the semi-trailer engages with a tractor.

4. In a semi-trailer, a frame for supporting the semi-trailer, an inclined slideway for supporting one end of the frame, and draft means positioned to the rear of the slideway and connected to the frame in such a way as to pull on the frame in the general direction of the inclined slideway for operating the same, whereby the frame is pulled up the slideway to inoperative position when the trailer engages a tractor and is pushed down the slideway when the trailer disengages a tractor.

5. In a semi-trailer, a rigid frame for supporting the trailer when it is disconnected from the tractor, this frame being connected to the trailer so that one end is movable longitudinally and one end is movable at an angle to the vertical and at an angle to the movement of the first mentioned end, and operating means connected to the frame whereby the frame is lifted from the ground when the trailer engages a tractor.

6. A support for a semi-trailer comprising the combination of a supporting frame, means for connecting one end of the frame to the semi-trailer which permits movement of that end of the frame at an angle to the vertical, means connecting another end of the frame to the trailer which permits longitudinal movement of the said other end and which longitudinal movement is at an angle to the movement of the first-mentioned end.

7. A support for a semi-trailer comprising the combination of a supporting frame, means for connecting one end of the frame to the semi-trailer which permits movement of that end of the frame at an angle to the vertical, means connecting another end of the frame to the trailer which permits movement of the said other end which is at an angle to the movement of the first mentioned end, and means operable upon engagement or disengagement of a tractor with a semi-trailer for causing such movement of the support.

8. In a semi-trailer, a slidable frame for supporting the semi-trailer when it is disconnected from a tractor, said frame being connected to the semi-trailer at two of its ends, and means for raising or lowering one end only of the supporting frame to position the same in inoperative or operative position.

In testimony whereof I affix my signature.

FREDERICK MALCOLM REID.